United States Patent
Vasudevan et al.

(10) Patent No.: US 8,573,761 B2
(45) Date of Patent: Nov. 5, 2013

(54) PIGMENTED INK-JET INKS WITH QUALITY ENHANCING POLYMERS

(75) Inventors: Sundar Vasudevan, Corvallis, OR (US); Jayprakash C. Bhatt, Corvallis, OR (US); Cory J. Ruud, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1878 days.

(21) Appl. No.: 11/372,967

(22) Filed: Mar. 10, 2006

(65) Prior Publication Data
US 2007/0211125 A1    Sep. 13, 2007

(51) Int. Cl.
*B41J 2/01* (2006.01)

(52) U.S. Cl.
USPC .............................................. 347/100; 347/95

(58) Field of Classification Search
USPC .......... 347/100, 95, 96, 101; 106/31.13, 31.6, 106/31.27; 523/160
See application file for complete search history.

(56) References Cited

U.S. PATENT DOCUMENTS

| | | | |
|---|---|---|---|
| 6,001,904 A | 12/1999 | Matzinger et al. | |
| 6,479,586 B2 * | 11/2002 | Matzinger | 525/123 |
| 6,511,534 B1 * | 1/2003 | Mishina et al. | 106/31.33 |
| 6,653,367 B2 * | 11/2003 | Miyabayashi | 347/100 |
| 2002/0086933 A1 | 7/2002 | Matzinger | |
| 2005/0150421 A1 | 7/2005 | Sawada et al. | |

FOREIGN PATENT DOCUMENTS

| | | |
|---|---|---|
| EP | 1 006 161 A1 | 6/2000 |
| EP | 1 491 597 A | 12/2004 |
| EP | 1 650 269 A | 4/2006 |
| EP | 1 650 273 A | 4/2006 |
| WO | 00/47419 A1 | 8/2000 |
| WO | WO 03/029362 A2 * | 4/2003 ............. C09D 11/00 |

* cited by examiner

*Primary Examiner* — Manish S Shah

(57) ABSTRACT

An ink-jet ink includes a jettable vehicle, a plurality of pigment solids dispersed in the jettable vehicle, and a plurality of structurally related polymers dispersed in the jettable vehicle. Additionally, a system for printing images on a porous photo medium includes a jettable ink and a printhead loaded with the jettable ink.

21 Claims, 2 Drawing Sheets

PIGMENTED INK-JET INKS WITH QUALITY ENHANCING POLYMERS

BACKGROUND

Ink-jet printing has become a popular method of recording images on various media surfaces, particularly paper, for a number of reasons, including, but not limited to, low printer noise, capability of high-speed recording, and multi color recording. Additionally, these advantages of ink-jet printing can be obtained at a relatively low price to consumers. Though there has been great improvement in ink-jet printing, improvements are followed by increased demands from consumers for higher speeds, higher resolution, full color image formation, increased stability, etc.

As new ink-jet inks and print engines are developed, several traditional characteristics are considered when evaluating the ink in conjunction with a print medium. Such characteristics include edge acuity and optical density of the image on the print medium, gloss, scratch durability, black to color bleed control, dry time of the ink on the print medium, adhesion to the print medium, lack of deviation in ink droplet placement, presence of all dots, resistance of the ink after drying to water and other solvents, long term storage stability, and long term reliability without pen material degradation or nozzle clogging. Though the above list of characteristics provides an illustration of factors to be optimized for improved ink-jet printing, there are challenges associated with satisfying all of the above characteristics. Often, the inclusion of an ink component meant to satisfy one of the above characteristics can prevent another characteristic from being met. Thus, traditional commercial inks for use in ink-jet printers represent a compromise in an attempt to achieve at least an adequate response in meeting all of the above listed characteristics.

One characteristic of ink-jet printing systems that is desirable to achieve is related to frequency response of the ink-jet ink, which is often proportional to ink throughput. Smaller drop sizes have increased the demand for higher frequency printing. With respect to this aspect, obtaining increased printing speed while retaining acceptable print quality is a constant challenge in the ink-jet printing industry.

For example, acceptable print quality is often difficult to achieve when pigment-based ink-jet inks are used in ink-jet printing systems to print color images on photo media. Photo media used with ink-jet printers generally include sheets that are similar to the base paper used in traditional silver-halide photographs so as to replicate the look and feel of traditional photographs. However, ink-jet printers with fast output speeds require photo media that absorb ink and dry quickly. Hence, some photo media also include one or more porous coatings. These porous coatings include a number of fine particles glued together in such a way that there are air spaces or pores in between them. These air spaces are later filled with ink and dyes as the water evaporates and facilitate relatively fast absorption and drying times.

However, while pigment-based ink-jet inks have good permanence properties when used on porous photo media, such inks often suffer from poor gloss and scratch durability. Accordingly, investigations continue into developing pigment-based ink formulations that can be printed accurately at high frequencies, and which have good gloss and scratch durability characteristics.

SUMMARY

In some exemplary embodiments, a system for printing images on a porous photo medium includes a jettable ink and a printhead loaded with the jettable ink. The jettable ink includes a jettable vehicle which includes a plurality of pigment solids and a plurality of structurally related polymers.

In another exemplary embodiment, a method of printing images on a porous photo medium includes providing a jettable ink and printing the jettable ink on the porous photo medium. The jettable ink includes a jettable vehicle which includes a plurality of pigment solids and a plurality of structurally related polymers.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

Throughout the drawings, identical reference numbers designate similar, but not necessarily identical, elements.

DETAILED DESCRIPTION

Figure 1:
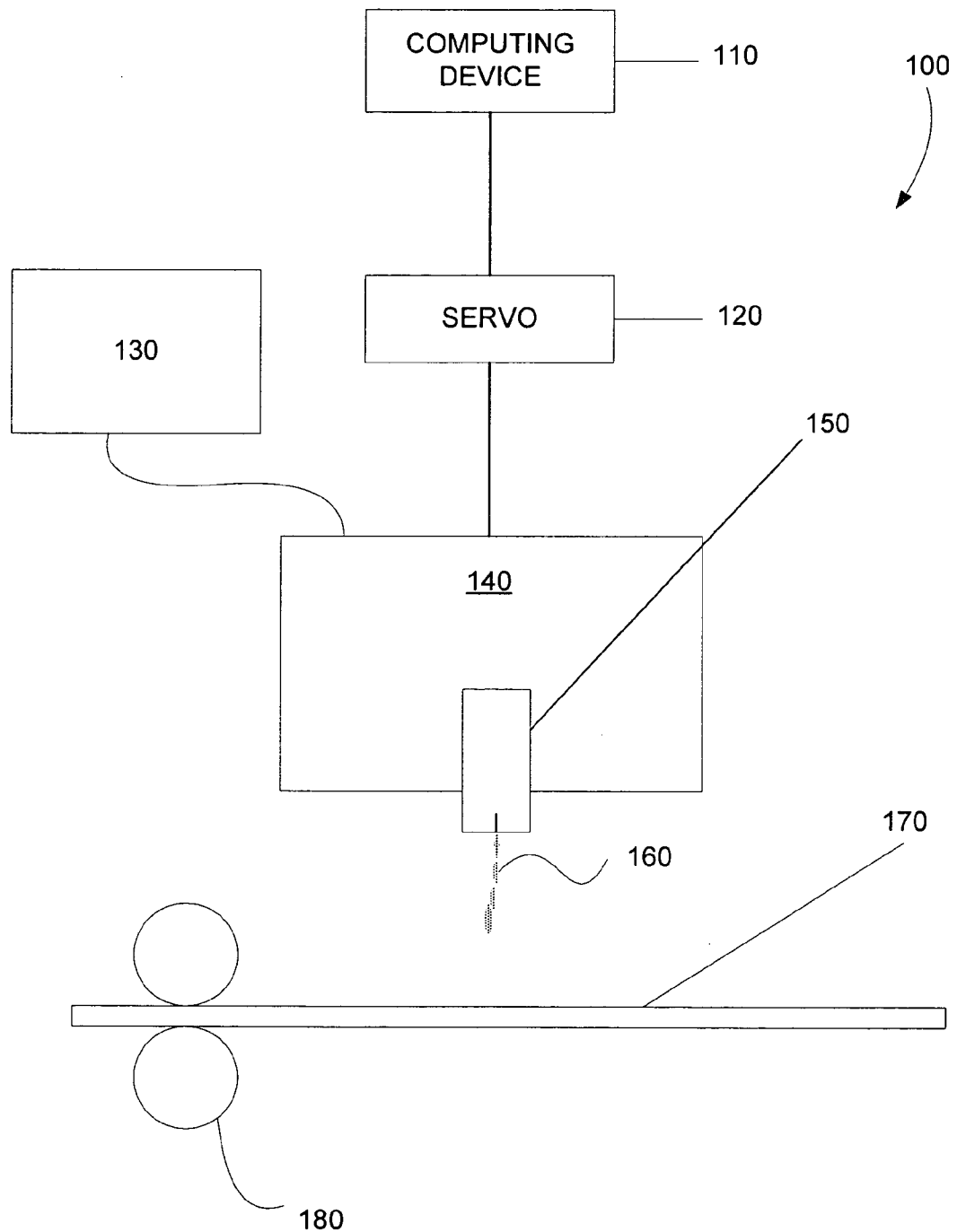
FIG. 1 illustrates an exemplary ink-jet printing system according to one exemplary embodiment.

Before the present systems and methods are disclosed and described, it is to be understood that the present systems and methods are not limited to the particular process and materials disclosed herein and may vary to some degree. It is also to be understood that the terminology used herein is used for the purpose of describing particular embodiments only and is not intended to be limiting, as the scope of the present systems and methods will be defined only by the appended claims and equivalents thereof.

In the present specification, and in the appended claims, unless otherwise specifically denoted, the following terminology will be used:

The singular forms "a," "an," and "the" include plural referents unless the context clearly dictates otherwise. Thus, for example, reference to "a pigment" includes reference to one or more of such materials.

The term "about" when referring to a numerical value or range is intended to encompass the values resulting from experimental error that may occur when taking measurements.

As used herein, "liquid vehicle" is defined to include liquid compositions that may be used to carry colorants, including pigments, to print media (e.g., photo media). Liquid vehicles are well known in the art, and a wide variety of liquid vehicle components may be used in accordance with the present systems and methods. Such liquid vehicles may include a mixture of a variety of different agents, including, but not limited to, surfactants, co-solvents, buffers, biocides, viscosity modifiers, sequestering agents, stabilizing agents, and water. Though not liquid per se, the liquid vehicle may also carry other solids, such as polymers, UV curable materials, plasticizers, salts, etc.

As used herein, "pigment" refers to a colorant particle which is typically substantially insoluble in the liquid vehicle in which it is used. Pigments may be chemically or physically attached to polymers which serve as a dispersing agent of the pigments in the liquid vehicle.

"Frequency response" refers to the performance of ink-jet ink and ink-jet architecture used in combination with respect to ink-jet ink firing speed, e.g., drops fired per unit of time. Generally, a nozzle firing frequency that is higher than contemplated for use with respect to a specific ink-jet ink and ink-jet architecture may result in poorer print performance, such as by producing misdirected ink drops and other undesirable characteristics. By current standards, firing frequencies above about 12 kHz are considered to be fast printing frequencies.

The term "porous" is a defined to involve a structure or material having a plurality of pores therein through which fluids, etc. may pass and/or reside.

"Pigment-based ink-jet ink" or "pigment-based ink" refers to ink that includes one or more pigments that may be used in an ink-jet printing system.

"Printed image" refers to ink that has been deposited or recorded on a photo medium.

"Gloss" of a surface is defined as its degree of approach to a mirror-like surface. It is a measure of the amount of energy reflected at a reflection angle equal to or near the angle of incidence. Gloss can be measured in terms of gloss units (gu) and at several angles, e.g., 20°, 30°, 45°, 60°, 75° and 80° from the surface normal. Gloss meters may be used to measure the gloss of a sample at various angles. The BYK-Gardner micro-TRI-glossmeter is an example of such an instrument.

"Scratch durability" refers to the ability of printed ink to withstand damage caused by scratching, rubbing, or other method of directly contacting the printed image.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. "Feathering" refers to the tendency of ink to spread undesirably into unprinted areas of the print media. Bleed and feathering typically occur prior to the printed inks fully drying on a print medium. The degree of bleed will depend on a variety of factors such as the drying speed of the ink, agglomeration of the colorant, and ink chemistry in general, among other variables.

"Edge acuity" refers to the crispness of a printed image along the border of the image.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary ink-jet printing system (100) that may be used to apply a pigment-based ink-jet ink (160) to an ink receiving medium (170). As shown in FIG. 1, the present system includes a computing device (110) controllably coupled through a servo mechanism (120) to a moveable carriage (140) having an ink-jet dispenser (150) disposed thereon. A material reservoir (130) is also coupled to the moveable carriage (140), and consequently to the ink-jet print head (150). A number of rollers (180) are located adjacent to the ink-jet dispenser (150) configured to selectively position an ink receiving medium (170). While the exemplary system (100) is described in the context of applying a pigment-based ink-jet ink (160) onto an ink receiving medium (170), the system (100) may be used to mark any number of items with the pigment-based ink-jet ink (160). The above-mentioned components of the exemplary system (100) will be described in further detail below.

The computing device (110) that is controllably coupled to the servo mechanism (120), as shown in FIG. 1, controls the selective deposition of a pigment-based ink-jet ink (160) on the ink receiving medium (170). The ink receiving medium (170) may include, but is not limited to, a porous photo medium (e.g., porous photo paper). The formation and composition of the pigment-based ink-jet ink (160) will be described in more detail below.

A representation of a desired image or text may be formed using a program hosted by the computing device (110). That representation may then be converted into servo instructions that are housed in a processor readable medium (not shown). When accessed by the computing device (110), the instructions housed in the processor readable medium may be used to control the servo mechanisms (120) as well as the movable carriage (140) and ink-jet dispenser (150). The computing device (110) illustrated in FIG. 1 may include, but is not limited to, a workstation, a personal computer, a laptop, a personal digital assistant (PDA), or any other processor containing device.

The moveable carriage (140) of the printing system (100) illustrated in FIG. 1 is a moveable material dispenser that may include any number of ink-jet material dispensers (150) configured to dispense the pigment-based ink-jet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the ink-jet dispensers (150) to selectively dispense the pigment-based ink-jet ink (160) at predetermined locations on ink receiving medium (170) as digitally addressed drops, thereby forming the desired image or text. The ink-jet material dispensers (150) used by the printing system (100) may include any type of ink-jet dispenser configured to perform the methods described herein including, but not limited to, thermally actuated ink-jet dispensers, mechanically actuated ink-jet dispensers, electrostatically actuated ink-jet dispensers, magnetically actuated dispensers, piezoelectrically actuated dispensers, continuous ink-jet dispensers, etc.

The material reservoir (130) that is fluidly coupled to the ink-jet material dispenser (150) houses the pigment-based ink-jet ink (160) prior to printing. The material reservoir may include any container configured to hermetically seal the pigment-based ink-jet ink (160) prior to printing and may be constructed out of any number of materials including, but not limited to, metals, plastics, composites, or ceramics. As illustrated in FIG. 1, the material reservoir (130) may be separate from, yet fluidly coupled to, the ink-jet material dispenser (150). Alternatively, the material reservoir (130) may be directly coupled to and form a part of the ink-jet material dispenser (150).

FIG. 1 also illustrates a number of components that facilitate reception of the pigment-based ink-jet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or positionally secure the ink receiving medium (170) during a printing operation.

Figure 2:
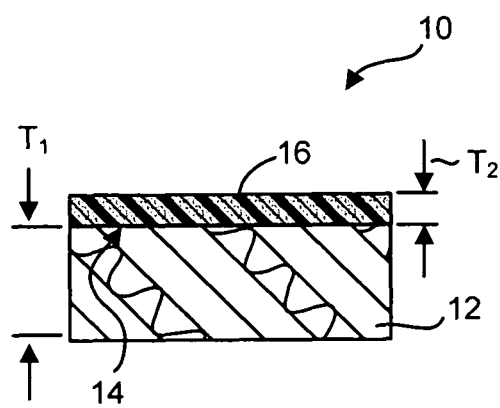
FIG. 2 illustrates an exemplary porous photo medium according to one exemplary embodiment.

As mentioned, the ink-jet printing system (100) shown in FIG. 1 may be used to print a color image on a porous photo medium. An exemplary porous photo medium (10) is shown in FIG. 2. The porous photo medium (10) includes a substrate (12) and at least one porous ink receiving layer (16). The substrate (12) may include any material made from paper, polymeric materials (e.g., polyester white film or polyester transparent film), photopaper (e.g., polyethylene or polypropylene extruded on one or both sides of paper), metals and/or mixtures thereof. Exemplary metals out of which the substrate (12) may be formed include, but are not limited to, aluminum, silver, tin, copper, alloys thereof, and/or mixtures thereof.

The substrate (12) may have any suitable thickness $T_1$ along substantially its entire length. Exemplary thicknesses of the substrate (12) range between about 0.025 mm and about 0.5 mm.

In some examples, the substrate (12) may be laminated or extruded with an ink-impermeable coating layer (not shown). An exemplary, but not exclusive, ink-impermeable coating layer is polyethylene. It is further contemplated that both sides of the substrate (12) may be coated with the ink-impermeable coating layer. In some alternative examples, a layer of gelatin may also be deposited on the polyethylene ink-impermeable coating layer.

As shown in FIG. 2, the substrate (12) may include an upper surface (14) upon which the various porous ink receiving layers (16) may be deposited or otherwise coupled. Any suitable deposition technique or manufacturing process may be used to deposit the porous ink receiving layer (16) on the substrate (12). Some examples of suitable deposition techniques/manufacturing processes include, but are not limited to, roll-coating, conventional slot-die processing, blade coating, slot-die cascade coating, curtain coating, spray-coating, immersion-coating, cast-coating, and/or other comparable methods including those that use circulating and non-circulating coating technologies.

The porous ink receiving layer (16) may have a representative and non-limiting uniform thickness $T_2$ along substantially its entire length ranging between about 1 μm and about 50 μm. However, it will be recognized that this range may be varied as best serves a particular application. Moreover, the porous ink receiving layer (16) may have any suitable dry coat weight as best serves a particular application. Exemplary dry coat weights of the porous ink receiving layer (16) range between about 5 gsm and about 50 gsm.

The porous ink receiving layer (16) is designed to provide a high degree of ink-retention capability to facilitate rapid absorption of liquid vehicles and, therefore, rapid drying of the printed image. Hence, the porous ink receiving layer (16) is generally non-swellable, or has a rigid structure, in the presence of liquids. As mentioned, the term "porous" is defined to involve a structure or material having a plurality of pores therein through which fluids, etc. may pass and/or reside. Hence, the transfer of fluids (e.g., pigment-based ink-jet ink and the like) into and through the porous ink receiving layer (16) may occur via physical phenomena normally associated with porous materials including capillary action and the like.

In some examples, the porous ink receiving layer (16) includes at least one pigment (namely, a material used to impart color, structure, void volume, opacity, and/or the like to a given formulation) and/or at least one binder composition (e.g., a composition having the ability to chemically, physically, and/or electrostatically retain one or more materials together in a given formulation or structure in order to provide mechanical strength, cohesiveness, and the like).

Additional or alternative ingredients may also be incorporated within the porous ink receiving layer (16) in variable quantities including, but not limited to, crosslinking compounds (non-limitative examples include borates, titanium salts, melamine-formaldehyde, glyoxals, thiourea-formaldehydes, and commercially available CURESAN™ from BASF Corp. located in Mount Olive, N.J., and mixtures thereof), fillers, surfactants, light-stabilizers, preservatives (e.g., antioxidants), general stabilizers, and/or the like, and/or mixtures thereof. The quantity of the additional components may range between about 0.1% and about 1% of the total porous ink receiving layer (16).

Exemplary Composition

In accordance with the present systems and methods, a system for printing images on a porous photo medium may include, as shown in FIG. 1, an ink-jet ink (160) and a printhead or other material dispenser (150) loaded with the ink-jet ink (160). An exemplary composition for the ink-jet ink (160) may include a liquid vehicle having about 0.001 wt % to about 10 wt % of pigment solids covalently attached to one or more polymers.

The polymers are used to disperse the pigment particles in the liquid vehicle and may include any suitable polymer as best serves a particular application. For example, the polymers may include, but are not limited to, styrene acrylic acid copolymers such as Joncryl® series polymers available from Johnson Polymers and Trudot IJ® series polymers available from Mead Westvaco. The polymers may additionally or alternatively include, but are not limited to styrene methacrylic acid copolymers, styrene maleic anhydride (SMA) polymers and derivatives from Sartomer™, poly urethane polymers, and the like. Other polymers useful as pigment dispersants are known to those skilled in the art.

Exemplary, but not limiting, Joncryl polymers suitable for use with the present systems and methods include the Joncryl 683 polymer and the Joncryl 690 polymer. Table 1 shows the properties of these two polymers:

TABLE 1

| Joncryl # | Mw | Acid No. | Tg (° C.) | Density |
|---|---|---|---|---|
| 683 | 8000 | 165 | 75 | 1.13 |
| 690 | 16500 | 240 | 102 | 1.07 |

In some examples, gloss and scratch durability of a printed ink-jet image on a porous photo medium are improved by using a combination of multiple structurally related polymers to disperse the pigment particles.

For example, two structurally related polymers are used to disperse the pigment particles. In some examples, a combination of the polymers are chosen so that the molecular weight (Mw) of the second polymer is about 30% to about 500% greater than the molecular weight of the first polymer. The composition is so chosen that the first polymer may comprise from about 50 wt % to about 99 wt % of the total polymer concentration and the second polymer may comprise from about 50 wt % to about 1 wt % of the total polymer concentration.

For example, the Joncryl 683 polymer may comprise about 50 wt % to about 99 wt % of the total polymer concentration used to disperse the pigment particles and the Joncryl 690 polymer may comprise about 1 wt % to about 50% of the total polymer concentration. However, it will be recognized that two or more polymers may be used in any proportion in connection with the present systems and methods.

Hence, in some examples, a method of improving gloss and scratch durability of a printed ink-jet image on a porous photo medium includes printing an inkjet image using an ink-jet ink (160) composition that has multiple polymers therein to disperse the ink-jet ink (160) onto the photo medium. The ink-jet ink (160) may include a liquid vehicle including about 0.1 wt % to about 6 wt % of pigment solids, about 1 wt % to about 35 wt % of organic co-solvent content, water, and other optional liquid components (e.g., surfactants, buffering agents, biocides, sequestering agents, viscosity modifiers, humectants, binders, and/or other known additives).

Liquid Vehicle Components

As described previously, a liquid vehicle may be used to carry the pigment solids and the polymers, as well as other solids that may be present in the ink-jet ink compositions of the present exemplary systems and methods. More specifically, the liquid vehicle may include water, from about 1 wt % to about 35 wt % of total organic co-solvent content, and other optional liquid components.

With respect to the total organic co-solvent content, co-solvents for use in the present systems and methods include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and/or ketones. The co-solvents may additionally or alternatively include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides.

Specific examples of co-solvents that may be used include, but are not limited to, 1,5-pentanediol, 2-pyrrolidone, propylene glycol n-butyl ether, Liponic ethylene glycol 1, Liponic ethylene glycol 7, 2-methyl-2,4-pentanediol, 2-methyl-1,3-propanediol, 2-ethyl-2-hydroxymethyl-1,3-propanediol, diethylene glycol, 3-methoxybutanol, and 1,3-dimethyl-2-imidazolidinone. Co-solvents may be added to reduce the rate of evaporation of water in the ink to minimize clogging or other properties of the ink such as viscosity, pH, surface tension, optical density, and print quality.

Other additives, such as ammonium salts and other salts, may also be included, such as at from 0.1 wt % to 4 wt % in some examples. Examples of such salts include ammonium acetate, ammonium sulfate, ammonium benzoate, potassium acetate, sodium acetate, sodium xylene sulfonate, potassium tartarate, sodium tartarate, lithium tartarate. If used, the presence of an ammonium salt may improve edge acuity and reduce bleed of printed images.

Various buffering agents may additionally or alternatively be used in the ink-jet ink compositions of the present systems and methods. Typical buffering agents include such pH control solutions as hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine; and other basic or acidic components. If used, buffering agents typically comprise less than about 10 wt % of the ink-jet ink composition.

In another example, various biocides may be used to inhibit growth of undesirable microorganisms. Several examples of suitable biocides include, but are not limited to, benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition.

EXAMPLE

The following example illustrates the embodiments of the systems and methods that are presently best known. However, it is to be understood that the following is only exemplary or illustrative of the application of the principles of the systems and methods described herein. Numerous modifications and alternative compositions, methods, and systems may be devised without departing from the spirit and scope of the present systems and methods. The appended claims are intended to cover such modifications and arrangements.

A test pigment-based ink-jet ink was prepared in accordance with the present systems and methods using components shown in Table 2.

TABLE 2

| Component | Test (wt %) |
| --- | --- |
| Pigment | 4 |
| 2-pyrrolidinone | 7.5 |
| Glycereth (26) | 4 |
| Proxel GXL | 0.2 |
| Water | balance |

The pigment was a magenta pigment (PR122) and included a 95:5 ratio of the following two polymers: Joncryl 683 and Joncryl 690. In other words, 95% of the total polymer concentration included Joncryl 683 and 5% of the total polymer concentration included Joncryl 690.

A control pigment-based ink-jet ink was also prepared using the components shown in Table 2 and the same total polymer concentration as the test pigment-based ink-jet ink. However the control pigment-based ink-jet ink only included the polymer Joncryl 683 and did not include Joncryl 690.

The control and test inks were filled in thermal ink-jet pens and printed using a DeskJet 6540 printer on an experimental porous photo media. After allowing the print samples to dry at ambient temperature over night, the gloss was measured at 20° from the surface normal. This test was repeated with seven different ink densities and an average initial gloss value over those seven ink densities was calculated.

The samples were then scratched with a finger nail and the damage caused, if any, was visually assessed and given a numerical rating. The sample was also smudged with an American Association of Textile Chemists and Colorists (AATCC) Crockmeter. The colorant transferred, if any was also given a numerical rating. For both of these visual ratings, a value of 1 was the worst and a value of 5 was the best. The results for the control and test inks are summarized in Table 3.

TABLE 3

| Sample | Control (Joncryl 683) | Test (95:5 Joncryl 683:690) |
|---|---|---|
| Average Initial Gloss (gu) | 29.86 | 37.92 |
| Gloss Standard Deviation | 4.86 | 3.04 |
| Gloss % Relative Standard Deviation | 16.28 | 8.03 |
| Visual Scratch Rating | 3 | 4 |
| Visual Transferred Rating | 4 | 4 |
| Total Scratch Durability Rating | 12 | 16 |

As shown in Table 3, the average initial gloss of the test ink-jet ink having the combination of the Joncryl 683 and Joncryl 690 was higher than the control ink that only included Joncryl 683.

Moreover, the gloss uniformity improved by adding the Joncryl 690 to the ink as evidenced by the lower standard deviation over the ink densities tested and relative standard deviation (Standard Deviation divided by the Average Initial Gloss) of the test ink compared to the control ink.

Table 3 also shows that the total scratch durability rating (defined herein as the visual scratch rating multiplied by the visual transferred rating) was higher for the test ink than the control ink.

Hence, by using a combination of polymers (e.g., Joncryl 683 and Joncryl 690), gloss and scratch durability are improved. Thus, the present systems and methods obviate the need for a separate gloss optimizer or enhancer fluid and are less expensive than alternative systems and methods.

The preceding description has been presented only to illustrate and describe embodiments of the invention. It is not intended to be exhaustive or to limit the invention to any precise form disclosed. Many modifications and variations are possible in light of the above teaching.

What is claimed is:

1. An ink comprising:
   a jettable vehicle;
   a plurality of pigment solids dispersed in said jettable vehicle; and
   a plurality of different, structurally related polymers dispersed in said jettable vehicle.

2. The ink of claim 1, wherein a combination of said pigment solids and said polymers comprises from about 0.001 wt % to about 10 wt % of said ink.

3. The ink of claim 1, further comprising from about 1 wt % to about 35 wt % of organic co-solvent content.

4. The ink of claim 1, wherein said plurality of structurally related polymers comprise at least one or more of a styrene acrylic acid copolymer, a styrene methacrylic acid copolymer, a styrene maleic anhydride polymer, and a poly urethane polymer.

5. The ink of claim 1, wherein said plurality of structurally related polymers comprise:
   a first polymer comprising from about 50 wt % to about 99 wt % of a total polymer concentration in said ink; and
   a second polymer comprising a remaining portion of said total polymer concentration in said ink.

6. The ink of claim 5, wherein said first polymer comprises about 95 wt % of said total polymer concentration.

7. The ink of claim 5, wherein a molecular weight of said second polymer is about 30 percent to about 500 percent greater than a molecular weight of said first polymer.

8. A system for printing images on a porous photo medium, said system comprising:
   a jettable ink; and
   a printhead loaded with said jettable ink;
   wherein said jettable ink comprises a jettable vehicle, said jettable vehicle comprising a plurality of pigment solids and a plurality of structurally related polymers.

9. The system of claim 8, wherein a combination of said pigment solids and said polymers comprises from about 0.001 wt % to about 10 wt % of said ink.

10. The system of claim 8, wherein, said jettable ink comprises from about 1 wt % to about 35 wt % of organic co-solvent content.

11. The system of claim 8, wherein said plurality of structurally related polymers comprise at least one or more of a styrene acrylic acid copolymer, a styrene methacrylic acid copolymer, a styrene maleic anhydride polymer, and a poly urethane polymer.

12. The system of claim 8, wherein said plurality of structurally related polymers comprise:
   a first polymer comprising from about 50 wt % to about 99 wt % of a total polymer concentration in said ink; and
   a second polymer comprising a remaining portion of said total polymer concentration in said ink.

13. The system of claim 12, wherein said first polymer comprises about 95 wt % of said total polymer concentration.

14. The system of claim 12, wherein a molecular weight of said second polymer is about 30 percent to about 500 percent greater than a molecular weight of said first polymer.

15. A method of printing images on a porous photo medium, said method comprising:
   printing with a jettable ink on said porous photo medium;
   wherein said jettable ink comprises a jettable vehicle, said jettable vehicle comprising a plurality of pigment solids and a plurality of different, structurally related polymers.

16. The method of claim 15, wherein a combination of said pigment solids and said polymers comprises from about 0.001 wt % to about 10 wt % of said ink.

17. The method of claim 15, wherein said plurality of structurally related polymers comprise at least one or more of a styrene acrylic acid copolymer, a styrene methacrylic acid copolymer, a styrene maleic anhydride polymer, and a poly urethane polymer.

18. The method of claim 15, wherein said plurality of structurally related polymers comprise:
   a first polymer comprising from about 50 wt % to about 99 wt % of a total polymer concentration in said ink; and
   a second polymer comprising a remaining portion of said total polymer concentration in said ink.

19. The method of claim 18, wherein said first polymer comprises about 95 wt % of said total polymer concentration.

20. The method of claim 18, wherein a molecular weight of said second polymer is about 30 percent to about 500 percent greater than a molecular weight of said first polymer.

21. The ink of claim 1, wherein said polymers comprise at least two different polymers that, in combination, are affective to improve both gloss and scratch durability of said ink.

* * * * *

UNITED STATES PATENT AND TRADEMARK OFFICE
CERTIFICATE OF CORRECTION

| | | |
|---|---|---|
| PATENT NO. | : 8,573,761 B2 | Page 1 of 1 |
| APPLICATION NO. | : 11/372967 | |
| DATED | : November 5, 2013 | |
| INVENTOR(S) | : Sundar Vasudevan et al. | |

It is certified that error appears in the above-identified patent and that said Letters Patent is hereby corrected as shown below:

In the Claims:

In column 10, line 17, in Claim 10, delete "wherein," and insert -- wherein --, therefor.

Signed and Sealed this
Twenty-second Day of April, 2014

Michelle K. Lee
*Deputy Director of the United States Patent and Trademark Office*